Aug. 14, 1928.

J. GRUNDY 1,680,609

BASEBALL SCORE CARD

Filed Feb. 18, 1927   2 Sheets-Sheet 1

Fig. 1.

Inventor
James Grundy
By C. A. Snow & Co.
Attorneys.

Aug. 14, 1928.                              1,680,609
J. GRUNDY
BASEBALL SCORE CARD
Filed Feb. 18, 1927          2 Sheets-Sheet 2
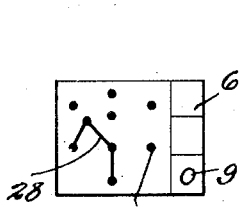 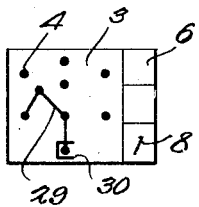 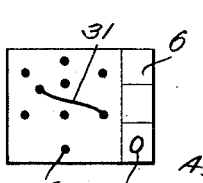 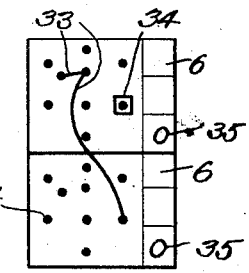
Fig.2.    Fig.3.    Fig.4.    Fig.5.
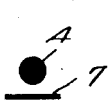 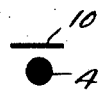  
Fig.6.    Fig.7.    Fig.8.    Fig.9.
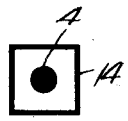  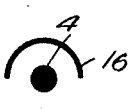 
Fig.10.   Fig.11.   Fig.12.   Fig.13.
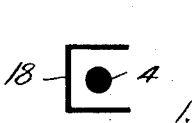 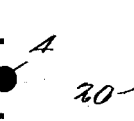 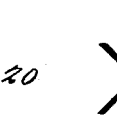 
Fig.14.  Fig.15.  Fig.16.  Fig.17.  Fig.18.
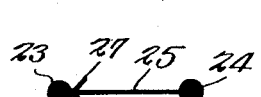 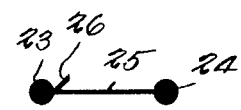
Fig.19.    Fig.20.
Inventor
James Grundy
By C. A. Snow & Co.
Attorneys.

Patented Aug. 14, 1928.

1,680,609

UNITED STATES PATENT OFFICE.

JAMES GRUNDY, OF PATERSON, NEW JERSEY.

BASEBALL SCORE CARD.

Application filed February 18, 1927. Serial No. 169,255.

This invention aims to provide an inexpensive means whereby an amateur may make a score record of a ball game which which will be quite as good as a record made by an expert scorer.

Figure 1 shows in plan, a device constructed in accordance with the invention.

Figures 2 to 5 are diagrams showing how vairous plays may be recorded.

Figures 6 to 20 are illustrations of conventional signs used by the scorer.

Recourse is had to a sheet S of any size and made of any desired material, the sheet being ruled in ink of any color, to form, for each team, areas 1 in which the names of the players in the team may be inscribed, as shown at 2, the sheet having, for each name-area 1, a plurality of inning spaces 3, there being in each inning space, a group of marks 4 so placed as to represent the stations of ball-nine players on a base ball diamond, the marks 4 in each group being spaced far enough apart so that conventional signs may be inscribed (as shown in Figure 9 for instance) about any mark, by a scorer, and so that the marks may be joined (as in Figures 2 to 5) by a line which will be plainly discernable between any two adjacent marks. In the drawings, the marks at 4 are dots, but any other kind of a mark may be used.

The area 1, in which the names of the players are inscribed, as at 2, run in one direction across the sheet, whereas the inning spaces 3 run at right angles to the above-specified direction. At the top of the chart for each team, there are numerals 5, individual to the inning spaces 3, and designating the number of innings. In the present instance it has been presupposed that the game will go to twelve innings, but the number of inning spaces may be varied from nine upwardly to any desired point. At the right hand end of each inning space 3 there are small spaces 6.

Referring to the conventional signs shown in Figures 6 to 20, the straight line 7 may be placed under any of the marks to indicate a hit to the particular player whose position is designated by that mark. If the hit matured into a run then the numeral 1, or the like, may be placed in one of the spaces 6, as shown at 8 in Figure 3: but if the runner was put out, then the mark "0" is placed in one of the spaces 6, as shown at 9 in Figure 2. A straight line over any of the marks, as shown at 10 in Figure 7 indicates an advance: whereas a right angle above one of the marks 4, as shown at 11 in Figure 8, indicates that the player was left on base. A triangle around one of the marks 4, as at 12 in Figure 9, and especially around that particular one of the marks 4 which indicates the home base, indicates that the player fanned out. In Figure 10 a rectangle, shown at 14, is placed around one of the marks 4. This conventional sign indicates that the player went to the first sack on balls: and if placed around the second base mark, around the third base mark, or around the home base mark, it indicates that the player was walked. The circle 15 of Figure 11 denotes a fly out to the player represented by the dot about which the circle is placed. In Figure 12, a half circle, shown at 16, is placed over the mark. This means a sacrifice fly to the player whose place is represented by the dot or mark at 4 in Figure 12. In Figure 13, a half circle, shown at 17, is placed under the mark 4 to show a sacrifice hit, to that player. A broken square, denoted by the numeral 18 in Figure 14, and placed around the mark 4 to represent the letter E more or less closely, indicates an error made by a player represented by that particular mark or dot. An upright half circle 19 (Figure 15) is used to record a stolen base. Referring to Figure 16, parallel lines 20 may be placed on either side of the mark 4 to approximate the outline of the letter H, such a record around the mark representing first base showing that the batter received this base on account of being hit by a pitched ball. The mark X shown at 21 in Figure 17 is used to show that a runner was forced out, and sometimes it may be convenient to use the asterisk 22 of Figure 18, for this same purpose. In Figures 19 and 20, the dot at 23 is the particular one of the marks 4 that represent the pitcher, and the dot at 24 designates, for example, the first baseman. An arrow 25 connecting the marks 24 and 23, with one barb as at 26, or with two barbs as at 27, shows that the first baseman gathered the ball and shot it to the pitcher covering his proper position.

Straight lines may be used in connection with the marks 4, and curved lines may be used also in connection with the marks 4, in any logical and reasonable way by the scorer, Figures 2 to 5 being noted at this point.

The arrangement of lines and dots shown at 28 in Figure 2 is a record of the fact that a runner on third base was trapped between third and home by the third baseman, shortstop, pitcher, and catcher, and that the runner was put out by the third baseman. When the lines are arranged as in Figure 3, at 29, with respect to certain of the marks 4, the same kind of a play is entered up as that recorded in Figure 2, with this exception: that, as shown by the use of the mark 18 of Figure 14, at 30 in Figure 3, the record not only shows that the runner made the home plate, but that, as well, the catcher made an error.

In Figure 4, the line at 31 indicates that the batter drove the ball to shortstop, who threw the ball to first base, the mark at 32, in one of the spaces 6, indicating that the runner was put out.

Other arrangements of lines, as shown at 33 in Figure 5, with the use of the conventional sign at 34, and the out marks at 35 in the spaces 6, show that complicated situations can be recorded readily. This particular diagram shows that the ball was batted to shortstop, who threw the ball to second baseman, and that the second baseman threw to first, putting batter out, the action constituting a double play.

Although certain conventional signs and marks have been mentioned hereinbefore, there is of course nothing to prevent the use of other marks and signs not specifically mentioned.

What is claimed is:—

A base ball scoring sheet provided with areas appropriately designated for the entry of names of players, and having, for each of said areas, a plurality of spaces marked to indicate successive game innings, there being in each of said spaces, a group of marks so placed as to represent the stations of a company of baseball players on a base ball diamond, the marks in each group being spaced far enough apart so that conventional signs may be inscribed near any mark, by a scorer, and so that the marks may be joined by a line which will be of sufficient length to be plainly discernable between any two adjacent marks.

In testimony that I claim the foregoing as my own, I have hereto affixed my signature.

JAMES GRUNDY.